(12) United States Patent
Sauerwein et al.

(10) Patent No.: US 7,919,066 B2
(45) Date of Patent: Apr. 5, 2011

(54) CALCIUM CARBONATE HYDROXODIALUMINATES COMPRISING A HEXAGONAL PLATELET-SHAPED CRYSTAL HABIT

(75) Inventors: Reiner Sauerwein, Steinberg (DE); Alfred Reimer, Fuerth i. Wald (DE); Ludwig Edenharter, Burglengenfeld (DE); Manfred Sorgalla, Schwandorf (DE); Wolfgang Wehner, Alsbach-Haehnlein (DE)

(73) Assignee: Nabaltec AG, Schwandorf (DE)

( * ) Notice: Subject to any disclaimer, the term of this patent is extended or adjusted under 35 U.S.C. 154(b) by 0 days.

(21) Appl. No.: 12/470,161

(22) Filed: May 21, 2009

(65) Prior Publication Data

US 2009/0292052 A1  Nov. 26, 2009

Related U.S. Application Data

(63) Continuation of application No. PCT/EP2007/009876, filed on Nov. 15, 2007.

(30) Foreign Application Priority Data

Nov. 21, 2006  (DE) .......................... 10 2006 055 214

(51) Int. Cl.
  C01B 31/30    (2006.01)
  C09K 3/00     (2006.01)
(52) U.S. Cl. ................... 423/420.2; 252/182.35
(58) Field of Classification Search ............. 252/182.35; 423/420.2
  See application file for complete search history.

(56) References Cited

U.S. PATENT DOCUMENTS

| | | | |
|---|---|---|---|
| 2,636,830 A | 4/1953 | Wall | |
| 3,607,863 A | 9/1971 | Dosch | |
| 3,992,217 A | 11/1976 | Baudouin et al. | |
| 4,353,751 A | 10/1982 | Baudouin et al. | |
| 4,963,608 A | 10/1990 | Kunieda et al. | |
| 5,670,568 A | 9/1997 | Plee et al. | |
| 5,997,836 A * | 12/1999 | Sato et al. | 423/420.2 |
| 6,084,013 A | 7/2000 | Wehner | |

FOREIGN PATENT DOCUMENTS

| | | |
|---|---|---|
| DE | 2 153 129 | 5/1973 |
| DE | 24 49 804 A1 | 5/1975 |
| DE | 24 24 763 | 12/1975 |
| DE | 30 44 399 A1 | 7/1981 |
| DE | 38 43 581 A1 | 7/1989 |
| DE | 195 26 370 A1 | 2/1996 |
| EP | 0 930 332 A2 | 7/1999 |
| EP | 1 669 397 A1 | 6/2006 |
| WO | WO 92/13914 | 8/1992 |
| WO | WO 93/25613 | 12/1993 |

OTHER PUBLICATIONS

Turriziani & Schippa, "Sull'esistenza del monocarboalluminato di calcio idrato", Ric. Sci 26, 1956, pp. 2792-2797.
Seligmann et al., "New Techniques for Temperature and Humidity Control in X-ray Diffractometry", Journal of the PCA Research Development Laboratories May 1962, pp. 2-9.
Francois et al., "A Cementitious Compound with Composition", Acta Crystallographica Section C, vol. 54, Nr. 9, 1998, pp. 1214-1217.
Renaudin et al., "Order and disorder in the lamellar hydrated tetracalcium monocarboaluminate compound", Cement and Concrete Research vol. 29, 1999, pp. 63-69.
Carlson et al., "Some Observations on the Calcium Aluminate Carbonate Hydrates", Journal of Research of the National Bureau of Standards, A. Physics and Chemistry, vol. 64A. No. 4, Jul.-Aug. 1960, pp. 333-341.
Oriakhi et al., "Incorporation of poly (acrylic acid), poly (vinylsulfonate) and poly (styrenesulfonate) within layered double hydroxides", Journal of Materials Chemistry, vol. 6, No. 1, 1996, pp. 103-107.
Leroux et al., "Polymer Interleaved Layered Double Hydroxide: A new Emerging Class of Nanocomposites", Journal of Materials Chemistry, vol. 13, No. 10, 2001, pp. 3507-3515.
"Kunststoffhandbuch PVC" [Plastics Handbook, PVC], vol. 2/1, W. Becker/H. Braun, 2nd Edition 1985, Carl Hanser Verlag, pp. 538-541 & pp; and vol. 2/2, pp. 1006-1007.

* cited by examiner

*Primary Examiner* — Milton I Cano
*Assistant Examiner* — John Uselding
(74) *Attorney, Agent, or Firm* — Muncy, Geissler, Olds & Lowe, PLLC

(57) ABSTRACT

A process is provided for preparing calcium carbonate hydroxodialuminates which have a hexagonal platelet-shaped crystal habit and are of the formula (A):

$$Ca_mAl_2(OH)_{6+2(m-1)}An^*nH_2O \qquad (A)$$

where m=3.5 to 4.5 and An=carbonate which may be partly replaced by perchlorate and/or trifluoromethanesulfonate (triflate) and n=0 to 6, comprising the steps of reacting calcium oxide or calcium hydroxide with optionally activated aluminum oxohydroxide or aluminum hydroxide and simultaneously or subsequently with a carbonate source consisting of carbon dioxide or alkali metal (bi)carbonate and optionally further reacting the product obtained in step (a) with perchloric acid and/or trifluoromethanesulfonic acid or optionally calcining the product obtained in step (a) at 200° C. to 900° C. and subsequently exchanging ions in the presence of a perchlorate and/or triflate salt, optionally in the presence of alkali metal (bi)carbonate, in water. The present invention further relates to the aluminates thus obtained in compositions and stabilizer systems and to the use thereof.

10 Claims, No Drawings

CALCIUM CARBONATE HYDROXODIALUMINATES COMPRISING A HEXAGONAL PLATELET-SHAPED CRYSTAL HABIT

This nonprovisional application is a continuation of International Application No. PCT/EP2007/009876, which was filed on Nov. 15, 2007, and which claims priority to German Patent Application No. DE 10 2006 055 214.8, which was filed in Germany on Nov. 21, 2006, and which are both herein incorporated by reference.

BACKGROUND OF THE INVENTION

1. Field of the Invention

The present invention relates to processes for preparing calcium carbonate hydroxodialuminates with a hexagonal platelet-shaped crystal habit, to the aluminates thus obtained in compositions and stabilizer systems, and to the use thereof.

2. Description of the Background Art

Novel lead-free PVC stabilizers require hydrotalcites as a stabilizer component for long-term stabilization in rigid PVC applications.

EP-A 930 332 also describes the use of tricalcium hydroxodialuminate for zinc-free systems. Calcium carbonate hydroxodialuminates are not described herein.

WO-A 93/25613 describes the preparation of katoites. Carbonate-containing compounds are not mentioned. The synthesis of katoites proceeding from calcium hydroxide and aluminum hydroxide is also described in DE-A 2 424 763. The flame-retarding action in thermoplastics, especially polystyrene, HDPE, PVC, SBR and EVA, is also demonstrated herein.

WO-A 92/13914 claims hydrocalumites as PVC stabilizers. Carbonate-containing homologs are not mentioned here either. The synthesis is effected by the coprecipitation method, which leads to additional salt ballasts in the wastewater.

DE-A 1 952 6370 discloses mixed alkaline earth metal aluminum hydroxides as acid scavengers for processing of thermoplastics. In the course of the preparation, molar amounts of NaOH have to be disposed of here via the salt burden.

Tetracalcium monocarbonate dodecahydroxodialuminate was isolated and characterized for the first time by Turriziani & Schippa [Ric. Sci. 26, 2792, (1956)]. The synthesis is costly and inconvenient (leaching of cement pastes) and the yield is low (preparation of thin films). In earlier studies, tetracalcium tetradecahydroxodialuminates were described, in which carbonates (hemi- or tetracarbonates) were later detected, though the carbonate formation very probably proceeded with carbon dioxide from the air.

JPCA Res. & Devel. Lab. (Portland Cement Assoc.) 4, 2 (1962) describes a method of forming $Ca_4Al_2(OH)_{13}(CO_3)_{0.5}*8H_2O$ in the course of reaction of $Ca_3Al_2O_6$ with $Ca(OH)_2$ in water, the product forming after a 6-month reaction time through a side reaction with the $CO_2$ from the air.

Act. Cryst. C54, 1214 (1998) describes $Ca_4Al_2(OH)_{12}CO_3*5H_2O$ in a three-component solid-state synthesis proceeding from $Ca(OH)_2$, $Al(OH)_3$ and $CaCO_3$ at 120° C. and a pressure of 2 kbar. The reaction time is 4 weeks. This study also includes an X-ray structure analysis.

A similar process is described in Cem. Conc. Res. 29, 63 (1999). A further synthesis is published in J. Res. NBS (National Bureau of Standards) 64A, 333 (1960): wherein monocalcium aluminate—obtained by burning $Al(OH)_3$ and $CaCO_3$ at 1250° C. for several hours—is mixed with $Ca(OH)_2$ and $Na_2CO_3$.

Recently, a practicable method for preparing tetracalcium monocarbonate dodecahydroxodialuminate hydrate has been specified: calcium nitrate is reacted with aluminum nitrate in the presence of sodium hydroxide solution and sodium carbonate solution in one step, the resulting gel being aged at 65° C. for 24 hours [J. Mater. Chem. 6 (1), 103 (1996) and Chem. Mater. 13, 3507 (2001)]. However, this coprecipitation process is not employable industrially (expensive reactants) and not very environmentally friendly, since considerable salt burdens are obtained in the wastewater.

None of these synthesis methods have any industrial significance whatsoever, since there are reaction times of several weeks, temperatures of more than 1000° C. or a low yield, such that the majority can only be referred to as methods of formation.

There is therefore a need for alternative processes for preparing calcium carbonate hydroxodialuminates and for further possible uses of such products.

SUMMARY OF THE INVENTION

It is therefore an object of the present invention to provide such processes and aluminates, and also uses.

DETAILED DESCRIPTION

The object is achieved by a process for preparing calcium carbonate hydroxodialuminates which have a hexagonal platelet-shaped crystal habit and are of the formula (A):

$$Ca_mAl_2(OH)_{6+2(m-1)}An*nH_2O \qquad (A)$$

where m=3.5 to 4.5 and An=carbonate which may be partly replaced by perchlorate and/or trifluoromethanesulfonate (triflate) and n=0 to 6, comprising the steps of (a) reacting calcium oxide or calcium hydroxide with optionally activated aluminum oxohydroxide or aluminum hydroxide and simultaneously or subsequently with a carbonate source consisting of carbon dioxide or alkali metal (bi)carbonate and (b1) optionally further reacting the product obtained in step (a) with perchloric acid and/or trifluoromethanesulfonic acid or (b2) optionally calcining the product obtained in step (a) at 200° C. to 900° C. and subsequently exchanging ions in the presence of a perchlorate and/or triflate salt, optionally in the presence of alkali metal (bi)carbonate, in water.

Preferably, m=3.8 to 4.2, An=carbonate which is optionally partly replaced by perchlorate and n=0 to 3.

Further preferably, alkali metal (bi)carbonate, preferably sodium or potassium carbonate, is added in step (a).

Additionally preferably, the carbonate source is subsequently converted in step (a).

The reaction in step (a) is preferably performed at temperatures of 25-180° C. at ambient pressure or under an elevated pressure of up to 12 bar.

The addition of carbonate or carbon dioxide affords hexagonal crystals which sediment very efficiently and are easily filterable. This phenomenon was surprising, since slimy products which are difficult to filter form when working in inert gas atmosphere without carbonate. The compounds are obtained as white solids. The yields are virtually quantitative.

A further advantage of this process is considered to be that compounds with a platelet-shaped or tablet-shaped crystal habit are obtained and as a result health risks in the workplace (respiratory disorders as caused by the inhalation of needle-shaped crystals) are minimized.

In addition, the actual process according to the invention for preparing the aluminates of the formula (A) may be followed by a further step (c) comprising (c) wet grinding the product obtained in step (a) or optionally in step (b), using a solids suspension of 50 to 700 g/l, preferably 100 to 500 g/l, more preferably 150 to 350 g/l, and grinding bodies of 0.2 to 2.0 mm, preferably 0.3 to 1.0 mm, more preferably 0.3 to 0.6 mm, and the mean particle size of the ground product being <10 μm, preferably <7 μm, more preferably <3 μm and most preferably <1 μm.

The present application further provides a process for coating calcium carbonate hydroxodialuminates, comprising the steps of (a) preparing calcium carbonate hydroxodialuminates as per the preparation process according to the invention and (b) coating the product at 50 to 80° C., using, for the coating, 1 to 10% stearic or palmitic acid or alkali metal salts thereof based on the product to be coated.

The present invention further relates to a composition comprising at least one calcium carbonate hydroxodialuminate obtainable from the process according to the invention for preparing the aluminates of the formula (A) and calcium hydroxide and/or aluminum hydroxide.

The composition may further comprise a synthetic polymer.

In this context, it is advantageous that the at least one calcium carbonate hydroxodialuminate is present in a concentration of 10 to 70% by weight, preferably 20-60% by weight, based on the synthetic polymer.

The synthetic polymer may especially be a thermoplastic and/or a halogenated polymer.

Especially in the case of halogenated polymers, preferably PVC, compounds of the formula (A) obtainable from the process according to the invention impart a very good thermal stability, especially in the case of high thermal stress (processing). This is surprising since no desired stabilizer action is achievable with compounds of the formula (A) where An=carbonate according to WO 92/13914 (carbonate-containing hydrocalumites).

The compounds of the formula (A) can also be used in other synthetic polymers or copolymers, such as HD (high density) and LD (low density) polyethylene (PE), polypropylene (PP), polybutylene (PB), polyisobutylene (PIB), polyester (PET), polyamide (PA), polyurethane (PUR), polystyrene (PS) or ABS (acrylonitrile-butadiene-styrene copolymer), SBR (styrene-butadiene rubber), SAN (styrene-acrylonitrile copolymer) and EVA (ethylene-vinyl acetate copolymer), preference being given to PS, SBR and EVA. In this context, they fulfill the function as fillers or flame retardants/smoke suppressants in an outstanding manner. The mechanical values here are good even in the case of high filler levels and the MFI (melt flow index) corresponds to the requirements of industry.

In addition, these compounds can be used as catalysts in base-catalyzed reactions (e.g. Claisen condensations and epoxidations of nitriles, and also transesterifications), and also in Bayer-Villiger oxidation reactions. In activated form, they can function as supports for other catalysts, for example for hydrogenations, redox reactions, Michael additions, Weitz-Schaeffer epoxidation and cyanoethylations.

The catalyst precursors used may be calcined (activated) analogues of compounds of the formula (A). The activation can be effected by calcining calcium carbonate hydroxodialuminates (A) at temperatures of 200 to 900° C., which eliminates water or water and carbon dioxide.

Typical representatives of calcium carbonate hydroxodialuminates of the formula (A) are as follows:

$Ca_4Al_2(OH)_{12}CO_3*nH_2O$;
$Ca_{4.25}Al_2(OH)_{12.5}CO_3*nH_2O$;
$Ca_{4.5}Al_2(OH)_{13}CO_3*nH_2O$;
$Ca_{3.75}Al_2(OH)_{11.5}CO_3*nH_2O$;
$Ca_{3.5}Al_2(OH)_{11}CO_3*nH_2O$;
$Ca_4Al_2(OH)_{12}(CO_3)_{0.75}(OH)_{0.5}*nH_2O$
$Ca_4Al_2(OH)_{12}(CO_3)_{0.5}(OH)*nH_2O$;
$Ca_4Al_2(OH)_{12}(CO_3)_{0.25}(OH)_{1.5}*nH_2O$;
$Ca_4Al_2(OH)_{12}(CO_3)_{0.75}(ClO_4)_{0.5}*nH_2O$;
$Ca_4Al_2(OH)_{12}(CO_3)_{0.5}ClO_4*nH_2O$;
$Ca_4Al_2(OH)_{12}(CO_3)_{0.25}(ClO_4)_{1.5}*nH_2O$
$Ca_4Al_2(OH)_{12}(CO_3)_{0.25}(triflate)_{1.5}*nH_2O$
$Ca_4Al_2(OH)_{12}(CO_3)_{0.75}(triflate)_{0.5}*nH_2O$
$Ca_4Al_2(OH)_{12}(CO_3)_{0.5}(triflate)*nH_2O$
$Ca_4Al_2(OH)_{12}(CO_3)_{0.5}(ClO_4)_{0.5}(triflate)_{0.5}*nH_2O$ In these formulae, n is as defined above.

Preference is given to compounds 1, 6, 7, 8, 9, 10, 11, 12, 13, 14 and 15. Very particular preference is given to compounds 1, 6, 7, 9 and 13.

Proceeding from the raw materials, calcium oxide or calcium hydroxide and aluminum oxohydroxide or aluminum hydroxide—in unactivated or activated form—and sodium (potassium) carbonate or bicarbonate or carbon dioxide, preference being given to sodium or potassium carbonate, and the addition more preferably being effected at a later stage, it is possible to obtain the calcium carbonate hydroxodialuminates of the formula (A) where An=carbonate, especially after heating for several hours with intensive stirring (up to 1000 rpm) in an aqueous phase and after removal by filtration, as white solids in virtually quantitative yield. The reaction is effected preferably at ambient pressure at 25-98° C. or at elevated temperatures of up to 180° C. and pressures of up to 12 bar.

Calcium oxide can be used in the form of quicklime or burnt lime, calcium hydroxide among other forms in the form of slaked lime or in aqueous suspension in the form of lime water or milk of lime, aluminum oxohydroxide in the form of bauxite, diaspore or boehmite, aluminum hydroxide among other forms in the form of gibbsite, hydrargillite or bayerite.

Perchlorate or triflate salts are obtained by reacting the compounds of the formula (A) with aqueous dilute perchloric acid or trifluoromethanesulfonic acid at room temperature. In an alternative synthesis, it is also possible to proceed from calcined (activated) compounds of the formula (A) where An=carbonate. In this case, activation is followed by loading via anion exchange with aqueous salt solutions, especially alkali metal perchlorate or triflate solutions, wherein alkali metal (bi)carbonate may be present.

Adsorbates of sodium perchlorate or sodium triflate are obtainable by spraying or stirring appropriate aqueous salt solutions on/with activated or unactivated compounds of the formula (A).

Preference is given to products with very fine and narrow particle size distribution. The particle size distribution of the products can be adjusted in a downstream step by means of stirred ball mills. This step is effected preferably on the reaction suspension at solids concentrations of 50-700 g/l, for which grinding bodies of size 0.2-2 mm can be used, the mean particle size of the millbase being <10μ.

Especially preferred are coated products. Coating with stearic acid or palmitic acid or alkali metal salts thereof is performed at 50 to 80° C. This step is effected before the filtration, i.e. during the process, or after the drying, i.e. after the process, by adding the fatty acids or alkali metal salts thereof, the amount thereof being between 1 and 10% by weight based on the product to be coated. This step can also be conducted in a Henschel mixer.

Calcium carbonate hydroxodialuminates of the formula (A) can be used as thermal stabilizers, especially for PVC, in amounts of 0.1 to 10 phr. Preference is given to 0.5 to 5.0 phr, particular preference to 1.0 to 3.0 phr.

The present invention thus further provides a stabilizer system for synthetic polymers, comprising at least one calcium carbonate hydroxodialuminate obtainable from the process according to the invention for the production thereof.

The compounds of the formula (A) are preferably present in amounts of 0.1 to 10 phr, preferably of 0.5 to 5.0 phr and more preferably of 1.3 to 3.0 phr.

A preferred stabilizer system comprises at least one of the following substances: calcium hydroxide, a zinc soap, a Ca/Zn stabilizer, a 1,3-diketone—including the Ca, Mg, Zn or Al salt thereof—, a polyol (e.g. maltitol, lactitol, palatinitol, pentaerythritol (PE), bis-PE, trimethylolpropane (TMP), bis-TMP or tris(hydroxyethyl) isocyanurate (THEIC)), a phosphorous ester, a glycidyl compound, an epoxidized fatty acid ester, an alkali metal perchlorate/triflate, alkaline earth metal perchlorate/triflate or zinc perchlorate/triflate, undissolved or dissolved in water or in an organic solvent, an aminouracil, dihydropyridine, aminocrotonic ester, a cyanoacetylurea or a perchlorate salt.

These and further additives which may be present in the inventive stabilizer systems are described hereinafter.

For thermal stabilization, especially of PVC, the following compounds or compound classes may additionally be present:
metal hydroxides or soaps (metal: Mg, Ca, Zn and Al)
hydrotalcites, dawsonites and zeolites
beta-diketones or beta-keto esters
aminouracils and -thiouracils
glycidyl compounds,
polyols (e.g. maltitol, lactitol, palatinitol, pentaerythritol, dipentaerythritol or THEIC)
phosphorous esters,
alkali metal, alkaline earth metal or zinc perchlorates (or triflates), undissolved or dissolved in water or an organic solvent (e.g. BDG (butyldiglycol), PEG (polyethylene glycol) or a polyol).

Further details of the compounds and compound classes (definitions and amounts) can be taken from EP 1 669 397.

In addition, the following additives can optionally be added:
fillers
lubricants
plasticizers
pigments
epoxidized fatty acid esters
antioxidants
UV absorbers and light stabilizers
blowing agents Detailed information on this subject is present in EP 1 669 397.

Additional additives are optical brighteners, antistats, biocides, processing aids, antifogging agents, gelating aids, impact modifiers, metal deactivators, flame retardants and smoke suppressants, and also compatibilizers. Descriptions on this subject can be found in "*Plastics Additives Handbook*", Edited by Dr. Hans Zweifel, Carl Hanser Verlag, 5th edition, 2000 and in "Handbook of Polyvinyl Chloride Formulating" E. J. Wickson, J. Wiley & Sons, 1993.

Examples of the chlorinated polymers to be stabilized are polymers of vinyl chloride, of vinylidene chloride, vinyl resins comprising vinyl chloride units in their structure, such as copolymers of vinyl chloride and vinyl esters of aliphatic acids, especially vinyl acetate, copolymers of vinyl chloride with esters of acrylic acid and methacrylic acid and with acrylonitrile, copolymers of vinyl chloride with diene compounds and unsaturated dicarboxylic acids or anhydrides thereof, such as copolymers of vinyl chloride with diethyl maleate, diethyl fumarate or maleic anhydride, postchlorinated polymers and copolymers of vinyl chloride, copolymers of vinyl chloride and of vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and of dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polymers and postchlorinated polymers of chlorobutadiene and copolymers thereof with vinyl chloride, chlorinated natural and synthetic rubbers, and mixtures of the polymers mentioned with one another or with other polymerizable compounds. In the context of this invention, PVC is also understood to mean copolymers of vinyl chloride with polymerizable compounds such as acrylonitrile, vinyl acetate or ABS, which may be suspension, bulk or emulsion polymers.

Preference is given to a PVC homopolymer, alone or in combination with polyacrylates or polymethacrylates.

Additionally useful are also graft polymers of PVC with EVA, ABS and MBS, and likewise graft polymers of PVC with PMMA (polymethyl methacrylate). Preferred substrates are also mixtures of the aforementioned homo- and copolymers, especially vinyl chloride homopolymers, with other thermoplastic or/and elastomeric polymers, especially blends with ABS, MBS (methyl methacrylate-butadiene-styrene copolymer), NBR (acrylonitrile-butadiene rubber), SAN, EVA, CPE (chlorinated PE), PMA (polymethyl acrylate), PMMA, EPDM (ethylene-propylene-diene elastomer) and polylactones, especially from the group of ABS, NBR, NAR (acrylonitrile-acrylate copolymer), SAN and EVA. The abbreviations used for the copolymers are familiar to the person skilled in the art and are as follows: ABS (acrylonitrile-butadiene-styrene); SAN (styrene-acrylonitrile); NBR (acrylonitrile-butadiene); NAR (acrylonitrile-acrylate); EVA (ethylene-vinyl acetate). In particular, styrene-acrylonitrile copolymers based on acrylate (ASA) are also useful.

Preferred components in this context are polymer compositions which comprise, as components (i) and (ii), a mixture of 25-75% by weight of PVC and 75-25% by weight of the copolymers mentioned. Of particular significance as components are compositions composed of (i) 100 parts by weight of PVC and (ii) 0 to 300 parts by weight of ABS and/or SAN-modified ABS and 0 to 80 parts by weight of the copolymers NBR, NAR and/or EVA, but especially EVA.

Additionally useful for stabilization in the context of this invention are also especially recyclates of chlorinated polymers, which may be the polymers described above in detail, which have been damaged as a result of processing, use or storage. Particular preference is given to PVC recyclate. A further use of the inventive stabilizer combinations is based on the fact that antistatic properties can be imparted to the finished article made of rigid or flexible PVC. In this way, it is possible to reduce the use of expensive antistats. For this use, preference is given to flexible PVC or semirigid PVC. Particular preference is given to flexible PVC or semirigid PVC.

The inventive stabilization is suitable both for chlorinated polymer compositions which constitute unplasticized or plasticizer-free or essentially plasticizer-free compositions, and for plasticized compositions. Particular preference is given to applications in rigid PVC or semirigid PVC.

The inventive compositions are suitable especially, in the form of formulations for hard PVC, for hollow bodies (bottles), packaging films (thermoforming films), blown films, "crash pad" films (automobiles), pipes, foams, heavy profiles (window frames), translucent wall profiles, construction profiles, films (including those produced by the Luvitherm process), profiles, sidings, fittings, office films and apparatus housing, insulators, computers and components of domestic appliances and for electronic applications, especially in the semiconductor sector. They are very particularly suitable for producing window profiles with high whiteness and surface shine.

Preferred other compositions in the form of formulations for semirigid and flexible PVC are for wire sheathing, cable insulation, decorative films, roof films, foams, agrochemical films, hoses, sealant profiles, floors, wallpaper, automobile parts, flexible films, injection moldings, office films and films for air-inflated structures. Examples of the use of the inventive compositions as plastisols are synthetic leather, floors, textile coatings, wallpaper, coil coatings and underbody protection for motor vehicles; examples of sintered PVC applications of the inventive compositions are slush, slush mold and coil coatings, and in E-PVC for films produced by the Luvitherm process. For further details on this subject see "KUNSTSTOFFHANDBUCH PVC" [Plastics Handbook, PVC], Volume 2/2, W. Becker/H. Braun, 2nd ed. 1985, Carl Hanser Verlag, p. 1236-1277.

The present invention further provides a calcium carbonate hydroxodialuminate obtainable by the process according to the invention for production thereof, where m=3.8 to 4.2, An=carbonate and n=0 to 3.

These calcium carbonate hydroxodialuminates and the inventive compositions can be used as a catalyst (precursor), for enzyme immobilization, as fillers, flame retardants or smoke suppressants for HDPE, PET, PS, SBR, SAN or EVA.

EXAMPLES

Example 1

Preparation of Tetracalcium Monocarbonate Dodecahydroxodialuminate Hydrate

In a reaction tank (5 m$^3$), 296 kg (4 kmol) of calcium hydroxide (Nekablanc®0 ex KFN) are suspended in 3 to of demineralized water. The suspension is heated to 90° C. with stirring.

At a stirrer speed of 900 rpm, 156 kg (2 kmol) of aluminum hydroxide (Apyral® 40CD ex NABALTEC) are added rapidly by means of an introduction screw. Subsequently, over the course of one hour, a solution of 106 kg (1 kmol) of sodium carbonate in 1 to of demineralized water is added, and the mixture is left at 90° C. with stirring for a further hour. The cooled suspension is then filtered through a filter press and washed virtually to neutrality with demineralized water, and the filtercake is dried in a mill dryer. The finely crystalline white powder has a hexagonal platelet-shaped crystal habit and is obtained in a yield of approx. 98% (506 kg). It has the following analysis values:

$CaO_{found}$: 41.8% $Al_2O_{3found}$: 19.3% $CO_2{}_{found}$: 9.3% $H_2O_{found}$: 29.6%

$CaO_{calc}$: 42.4% $Al_2O_{3calc}$: 19.8% $CO_{2calc}$: 8.5% $H_2O_{calc}$: 29.3%

($H_2O$ content calculated from the difference)

This corresponds to the empirical formula: $3.9CaO*Al_2O_3*CO_2*8.4H_2O$ (MW=516.2)

or $Ca_{3.9}Al_2(OH)_{11.8}CO_3*2.5H_2O$

XRD analysis shows that the starting materials $Ca(OH)_2$ (portlandite) and $Al(OH)_3$ (gibbsite) are present in only small amounts of <5%.

The lattice parameters are: 2Θ=11.8° (basal reflection) and d=7.5 Å (interplanar spacing)

Examples 2 to 4

Performance Testing of the Inventive Product PM1 Compared To the Commercial Products PM2 And PM3

A substance sample from example 1 (PM1, example 2) is subjected to a dynamic heat test (DWT) at 180° C. in comparison with HYSAFE 549 (commercial hydrotalcite from M.J. HUBER Corp.—PM2, example 3) and ZEOLON P4A (commercial sodium zeolite A from MAL RT—PM3, example 4). The test is performed on a COLLIN W110E roll mill (roll diameter: 110 mm, 10 rpm, friction: −10%).

The mixtures have the following composition (tab. 1).

TABLE 1

Composition of the mixtures

| Components (parts by weight) | Example 2 | Example 3 | Example 4 |
|---|---|---|---|
| PVC (K value 70)[1] | 100 | 100 | 100 |
| DOP | 50 | 50 | 50 |
| POLCARB 50SV[2] | 50 | 50 | 50 |
| Ca/Zn stabilizer[3] | 1.43 | 1.43 | 1.43 |
| PM1 | 2.57 | — | — |
| PM2 | — | 2.57 | — |
| PM3 | — | — | 2.57 |

[1] = VINNOLIT S4170, from VINNOLIT GmbH;
[2] = chalk, from IMERYS group;
[2] = CZ stabilizer without long-term component The mixtures are homogenized on the roll mill at 180° C. for 5 minutes. Subsequently, rolling is continued at 180° C. and specimens (d=0.3 mm, 25×38 mm) are taken at 5 minute intervals and the yellowing thereof (YI value) is determined with a calorimeter from BYK GARDNER (Spectro Guide Sphere Gloss) to ASTM D1925.

The YI values of the individual specimens can be taken from tab. 2 below (the lower the YI value, the better the efficacy).

TABLE 2

YI values of the specimens

| Minutes | Example 2 | Example 3 | Example 4 |
|---|---|---|---|
| 5 | 31.0 | 36.6 | 35.0 |
| 10 | 37.6 | 39.8 | 40.7 |
| 15 | 40.4 | 48.0 | 46.4 |
| 20 | 44.4 | 50.7 | 48.6 |
| 25 | 45.2 | 54.7 | 52.3 |
| 30 | 46.3 | 57.4 | 54.8 |
| 35 | 47.3 | 59.2 | 56.8 |
| 40 | 48.1 | 61.6 | 58.3 |

TABLE 2-continued

YI values of the specimens

| Minutes | Example 2 | Example 3 | Example 4 |
|---|---|---|---|
| 45 | 49.2 | 63.5 | 61.2 |
| 50 | 50.3 | 64.8 | 62.7 |
| 55 | 50.9 | 65.4 | 65.7 |
| 60 | 52.0 | 67.7 | 66.7 |
| 65 | 54.2 | 69.1 | 69.9 |
| 70 | 56.4 | 68.2 | 71.9 |
| 75 | 57.3 | 72.3 | 74.9 |
| 80 | 59.9 | 71.4 | 76.0 |
| 85 | 62.8 | 72.6 | 79.3 |
| 90 | 63.2 | 73.7 | 79.8 |

As is evident, inventive example 2 is clearly superior to the closest prior art (PA)—examples 3 and 4—in terms of initial color (AF) and color retention (FH).

Examples 5 to 7

Formulation Modifications of PM-1 (See Tab. 3)

TABLE 3

Various formulation compositions

| Components (parts by weight) | Example 5 | Example 6 | Example 7 |
|---|---|---|---|
| PVC [1](K value 70) | 100 | 100 | 100 |
| DOP | 50 | 50 | 50 |
| POLCARB 50SV [2] | 50 | 50 | 50 |
| Ca/Zn-stabilizer [3] | 1.43 | — | — |
| PM1 | 2.57 | 2.57 | 2.57 |
| ESBO [4] | 3.0 | — | 3.0 |
| Zn-free stabilizer [5] | — | 1.43 | 1.43 |

[1] = VINNOLIT S4170, from VINNOLIT GmbH;
[2] = chalk, from IMERYS GROUP;
[3] = CZ stabilizer without long-term component;
[4] = LANKROFLEX E2307, from AKROS;
[5] = aminouracil-based The mixtures are homogenized and tested analogously to the above examples. The YI values can be taken from tab. 4 which follows.

TABLE 4

YI values of the specimens

| Minutes | Example 5 | Example 6 | Example 7 |
|---|---|---|---|
| 5 | 35.5 | 32.2 | 30.0 |
| 10 | 38.1 | 32.5 | 31.0 |
| 15 | 39.5 | 32.9 | 31.2 |
| 20 | 40.5 | 33.8 | 32.2 |
| 25 | 41.2 | 34.3 | 33.0 |
| 30 | 41.9 | 35.5 | 33.5 |
| 35 | 42.7 | 36.4 | 34.4 |
| 40 | 43.8 | 37.7 | 36.0 |
| 45 | 45.0 | 390 | 37.2 |
| 50 | 46.0 | 40.0 | 38.4 |
| 55 | 46.8 | 42.0 | 39.4 |
| 60 | 48.0 | 44.0 | 40.2 |
| 65 | 48.9 | 46.0 | 41.5 |
| 70 | 50.1 | 49.0 | 43.0 |
| 75 | 51.0 | 49.5 | 44.1 |
| 80 | 52.1 | 51.6 | 45.8 |
| 85 | 52.8 | 54.5 | 47.2 |
| 90 | 53.7 | 58.3 | 48.0 |

A comparison of example 2 with example 6 shows that an alternative stabilization based on an aminouracil has a significant improvement in AF and FH (40 and 18% respectively at YI: 37.7/37.6 and YI: 49.2/49.0). Equally, a comparison of examples 6 and 7 with addition of ESBO shows a significant increase.

TABLE 5

DHC values of the specimens

| Conductivity [µS/cm] | Example 5 [minutes] | Example 6 [minutes] | Example 7 [minutes] |
|---|---|---|---|
| $t_{10}$ | 62 | 77 | 88 |
| $t_{50}$ | 96 | 135 | 149 |
| $t_{200}$ | 179 | 233 | 313 |

A comparison of example 2 with example 5 shows that addition of ESBO gives rise to an enhancement in performance of 18 or 17% (YI: 45.2/45.0 and YI: 48.1/48.0).

In DHC ($t_{10}$, $t_{50}$ and $t_{200}$ values according to DIN 53 581—method B: conductivity measurements[1])—see tab. 5—substitution of the Zn stabilizer for organic-based stabilization shows a clear improvement (increase in the $t_{10}$, $t_{50}$ and $t_{200}$ values to 41%, 55% and 75%).

[1] see WO 2006/013040, p. 64, 65—Use of rolled PVC sheet samples instead of PVC powder samples Example 9

Water Storage Tests of Specimens

Production of the Compounded Materials 1000 g of compounded material according to examples 2, 3 and 4 in a Henschel mixer (approx. 15 min, 110° C., 2500 rpm).

Production of the Pressed Slabs

Kneader (PolyLab System, from ThermoElectronCorp.: drive: Rheocord 300p, kneader: Rheomix 3000p, 180 to 185° C., 40 rpm, 12 to 15 min.); press (Polystat 300S, from Schwabenthan: 12 min., 175° C., 100 kp/cm²), slab dimensions: 180×250×3 mm.

(a) Water storage procedure: The pressed slabs are stored on the basis of ISO 62:1999 in dist. water (500 ml, 23° C.) for 3 weeks (see tab. 6)

TABLE 6

Water absorption of the individual specimens [% by weight]:

| | Day 1 | Day 2 | Day 3 | Day 7 | Day 14 | Day 21 |
|---|---|---|---|---|---|---|
| Example 2 [a] | 0.074 | 0.104 | 0.134 | 0.224 | 0.313 | 0.373 |
| Example 3 | 0.098 | 0.131 | 0.164 | 0.279 | 0.378 | 0.460 |
| Example 4 | 0.097 | 0.130 | 0.163 | 0.260 | 0.358 | 0.439 |

[a] = coated with 2.5% stearic acid after the synthesis

The numerical values show an increase in the water absorption of example 2 over example 4 and example 3, i.e. there is an improvement with the inventive compounds over the prior art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A process for preparing calcium carbonate hydroxodialuminates which have a hexagonal platelet-shaped crystal habit and are of the formula (A):

$$Ca_mAl_2(OH)_{6+2(m-1)}An*nH_2O \quad (A)$$

where m=3.5 to 4.5 and An=carbonate which may be partly replaced by perchlorate and/or trifluoromethanesulfonate and n=0 to 6, comprising the steps of:
  (a) reacting calcium oxide or calcium hydroxide with optionally activated aluminum oxohydroxide or aluminum hydroxide and simultaneously or subsequently with a carbonate source consisting of carbon dioxide or alkali metal carbonate or bicarbonate; and
  (b1) optionally further reacting the product obtained in step (a) with perchloric acid and/or trifluoromethanesulfonic acid; or
  (b2) optionally calcining the product obtained in step (a) at 200° C. to 900° C. and subsequently exchanging ions in the presence of a perchlorate and/or trifluoromethanesulfonate salt, optionally in the presence of alkali metal carbonate or bicarbonate, in water,
  wherein the reaction in step (a) is performed at temperatures of 25-180° C. at ambient pressure or under an elevated pressure of up to 12 bar.

2. The process as claimed in claim 1, wherein m=3.8 to 4.2, An=carbonate which is optionally partly replaced by perchlorate and n=0 to 3.

3. The process as claimed in claim 1, wherein alkali metal carbonate or bicarbonate is added in step (a).

4. The process as claimed in claim 1, wherein the carbonate source is subsequently converted in step (a).

5. The process as claimed in claim 1, comprising the further step of:
  (c) wet grinding the product obtained in step (a) or optionally in step (b1) or (b2), using a solids suspension of 50 to 700 g/l and grinding bodies of 0.2 to 2.0 mm, and the mean particle size of the ground product being <10 μm.

6. The process as claimed in claim 1, wherein sodium or potassium carbonate is added in step (a) as the alkali metal bicarbonate.

7. The process as claimed in claim 1, wherein calcium oxide is reacted in step (a).

8. The process as claimed in claim 1, wherein calcium hydroxide is reacted in step (a).

9. The process as claimed in claim 1, wherein said carbonate source in step (a) comprises carbon dioxide.

10. The process as claimed in claim 1, wherein An is a carbonate which has been partly replaced by perchlorate.

* * * * *